United States Patent
Long et al.

(10) Patent No.: US 8,245,214 B2
(45) Date of Patent: Aug. 14, 2012

(54) RELIABLY UPDATING COMPUTER FIRMWARE WHILE PERFORMING COMMAND AND CONTROL FUNCTIONS ON A POWER/THERMAL COMPONENT IN A HIGH-AVAILABILITY, FAULT-TOLERANT, HIGH-PERFORMANCE SERVER

(75) Inventors: Thomas C. Long, Poughkeepsie, NY (US); Robert P. Makowicki, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 1105 days.

(21) Appl. No.: 12/133,421

(22) Filed: Jun. 5, 2008

(65) Prior Publication Data

US 2009/0307677 A1 Dec. 10, 2009

(51) Int. Cl.
*G06F 9/44* (2006.01)
(52) U.S. Cl. ........................................... 717/168
(58) Field of Classification Search .................... 717/168
See application file for complete search history.

(56) References Cited

U.S. PATENT DOCUMENTS

| | | | |
|---|---|---|---|
| 5,971,851 A * | 10/1999 | Pascal et al. | 463/24 |
| 6,154,838 A * | 11/2000 | Le et al. | 713/2 |
| 6,360,362 B1 * | 3/2002 | Fichtner et al. | 717/168 |
| 7,086,049 B2 * | 8/2006 | Goodman | 717/168 |
| 7,313,682 B2 * | 12/2007 | Kanapathipillai et al. | 713/2 |
| 7,809,811 B1 * | 10/2010 | Rao | 709/221 |
| 7,810,088 B2 * | 10/2010 | Herle et al. | 717/173 |
| 7,971,199 B1 * | 6/2011 | Chen | 717/168 |
| 7,991,988 B2 * | 8/2011 | Chen | 713/1 |
| 2002/0129233 A1 * | 9/2002 | Hillis et al. | 713/2 |
| 2004/0194081 A1 * | 9/2004 | Qumei et al. | 717/173 |
| 2004/0230963 A1 * | 11/2004 | Rothman et al. | 717/168 |
| 2005/0055595 A1 * | 3/2005 | Frazer et al. | 713/400 |
| 2005/0132351 A1 * | 6/2005 | Randall et al. | 717/168 |
| 2005/0144609 A1 * | 6/2005 | Rothman et al. | 717/168 |
| 2006/0070055 A1 * | 3/2006 | Hodder et al. | 717/168 |
| 2007/0079015 A1 * | 4/2007 | Royer et al. | 710/5 |
| 2007/0169098 A1 * | 7/2007 | Kikuchi | 717/168 |
| 2008/0276222 A1 * | 11/2008 | Yamagami | 717/124 |
| 2009/0241103 A1 * | 9/2009 | Pennisi et al. | 717/173 |

* cited by examiner

*Primary Examiner* — Hung T Vy
*Assistant Examiner* — Hua Lu
(74) *Attorney, Agent, or Firm* — Dennis Jung, Esq.; Kevin P. Radigan, Esq.; Heslin Rothenberg Farle & Mesiti P.C.

(57) ABSTRACT

A system and incorporated method is provided for performing high reliability flash updates using firmware residing in a computing environment. The system comprises a nonvolatile memory having a boot sector and an application sector and a volatile memory in processing communication to update the nonvolatile memory. The volatile memory also includes an implemented algorithm that can temporarily store functions necessary to update the nonvolatile memory via a flash update.

20 Claims, 7 Drawing Sheets

US 8,245,214 B2

RELIABLY UPDATING COMPUTER FIRMWARE WHILE PERFORMING COMMAND AND CONTROL FUNCTIONS ON A POWER/THERMAL COMPONENT IN A HIGH-AVAILABILITY, FAULT-TOLERANT, HIGH-PERFORMANCE SERVER

BACKGROUND OF THE INVENTION

1. Field of the Invention

This invention relates to updating the firmware of a computing system and more particularly updating the firmware of a computing system having one or more large high-performance servers.

2. Description of Background

A computing system can include a simple personal computer, a network of simple computers, or one or even a network of large computers that include one or more central electronic systems (CEC). Most computing environments today include several types of memory for storing and manipulating data. The most common are ROM, RAM and PROM memories. Firmware is a computer program that is embedded in a hardware device, for example a microcontroller. Firmware is the code that runs in the ROM and RAM memory of that microcontroller. In addition, firmware can be provided on flash ROMs or as a binary image file that can be uploaded onto existing hardware by a user.

Firmware has evolved to mean the programmable content of a hardware device, which can consist of machine language instructions for a processor, or configuration settings for a fixed-function device, gate array or programmable logic device. Traditionally, firmware has been stored in ROM, however cost and performance requirements have driven component vendors to adopt various replacements, including non-volatile media such as PROMa and Flash, or SRAM solutions. Firmware can now be updated electronically or by replacing a storage medium. In some respects firmware is as much a software component of a working system as the operating system. However, unlike most modern operating systems, firmware rarely has a well evolved mechanism for updating itself to fix bugs and addressing functionality issues that are detected after the unit is shipped. Updating firmware can result in serious reliability issues for the system environment. If the operation is done incorrectly or finishes improperly, it renders a device or even an environment unusable.

Therefore there is a need for a method and associated assembly that can provide highly reliable, flash updates of the firmware in a computer environment, especially one that includes microcontrollers and high performance servers.

SUMMARY OF THE INVENTION

The shortcomings of the prior art are overcome and additional advantages are provided through the provision of a method and incorporated system for performing high reliability flash updates using firmware residing in a computing environment. The system comprises a nonvolatile memory having a boot sector and an application sector and a volatile memory in processing communication to update the nonvolatile memory.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1:
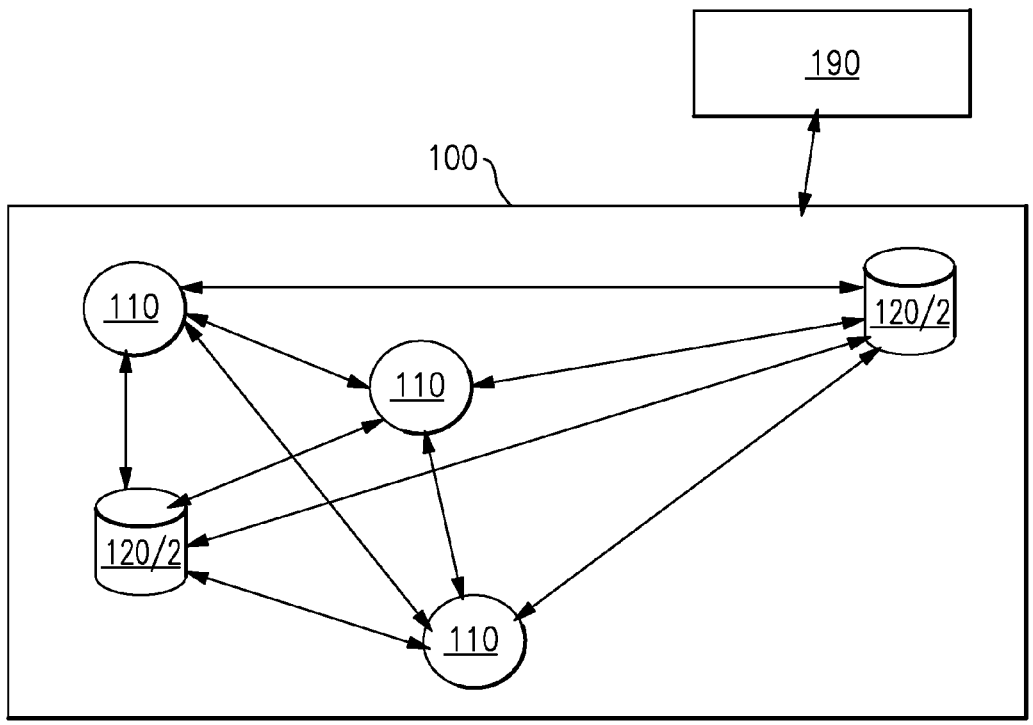
FIG. 1 is an illustration of a computing environment having a plurality of nodes in processing communication with one another.

FIG. 1 is an illustration of a computing environment 100 having a plurality of nodes 110 and storage devices 120/122, including ROMs and Rams, which are in processing communication with one another. The computing environment 100 can be large or small and the nodes can be in processing communication with one another remotely or stored in proximal housings. Furthermore, the environment 100 can represent a sophisticated environment having one or more high performance servers as nodes 110; or it can represent a smaller environment such as a microcontroller. In addition, environment 100 can be in processing communication with other environments, represented as numeral 190. For example, environment 100 can be a microcontroller driving another high performance environment 190 having large servers. For ease of understanding, in the present example, environment 100 reflects a smaller environment such as a microcontroller.

Environment 100 includes a nonvolatile memory or ROM 120. In such a nonvolatile memory, the contents of the memory are not lost when power is cycled to the microcontroller. The environment 100 also includes a volatile memory or RAM 122. The contents of this volatile memory are lost when power is cycled to the microcontroller. In this embodiment, firmware is also implemented although not particularly illustrated. Firmware, in this application, can be thought of as the code that runs in the ROM 100 and RAM 120 memory of the microcontroller. In a preferred embodiment as will be discussed by way of example herein, a power/thermal firmware, in particular, in connection with the microcontroller environment 100 and its components is implemented as well.

The particular components of the embodiment of FIG. 1, is provided in more details in subsequent figures, FIGS. 2 through 8, as will be discussed presently. In conjunction with FIGS. 2 through 8, different components, including algorithms, through which the firmware for the environment can be updated, will also be discussed. In a preferred embodiment, this updating includes flash updates.

Figure 2:
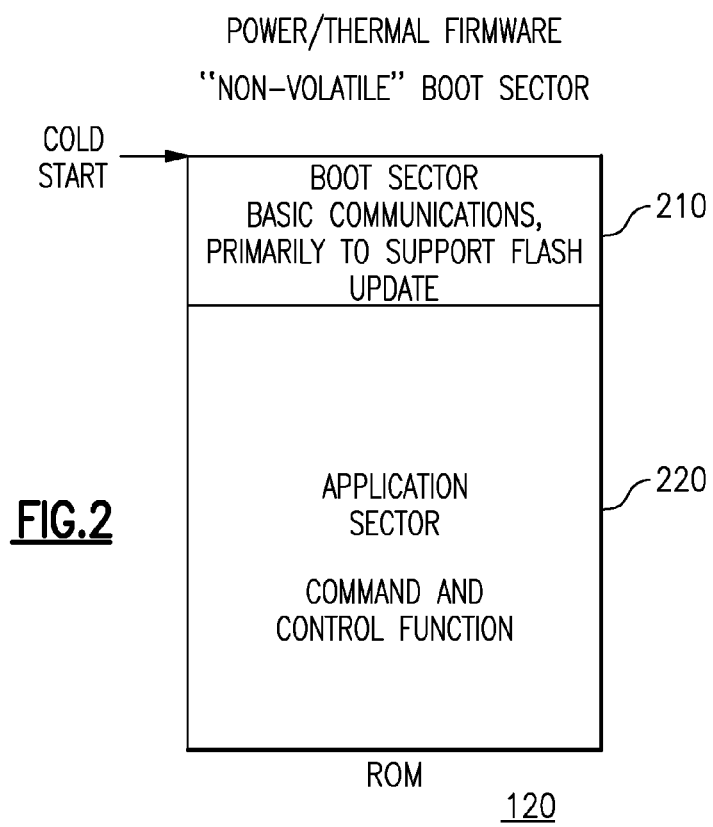
FIG. 2 is a schematic illustration of a system utilizing a non-volatile memory.
Figure 3:
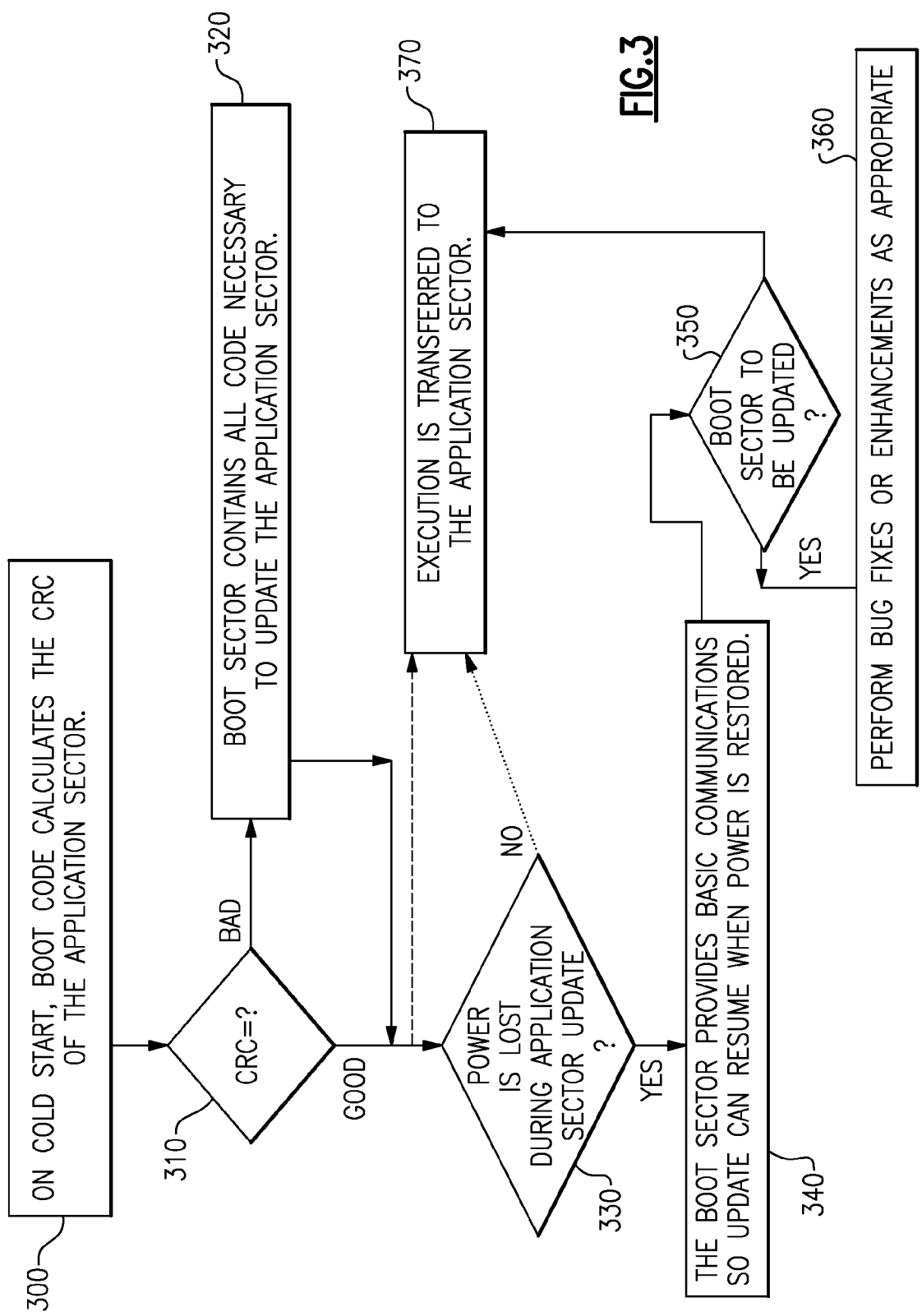
FIG. 3 provides a flowchart of the embodiment as provided in FIG. 2.
Figure 4:
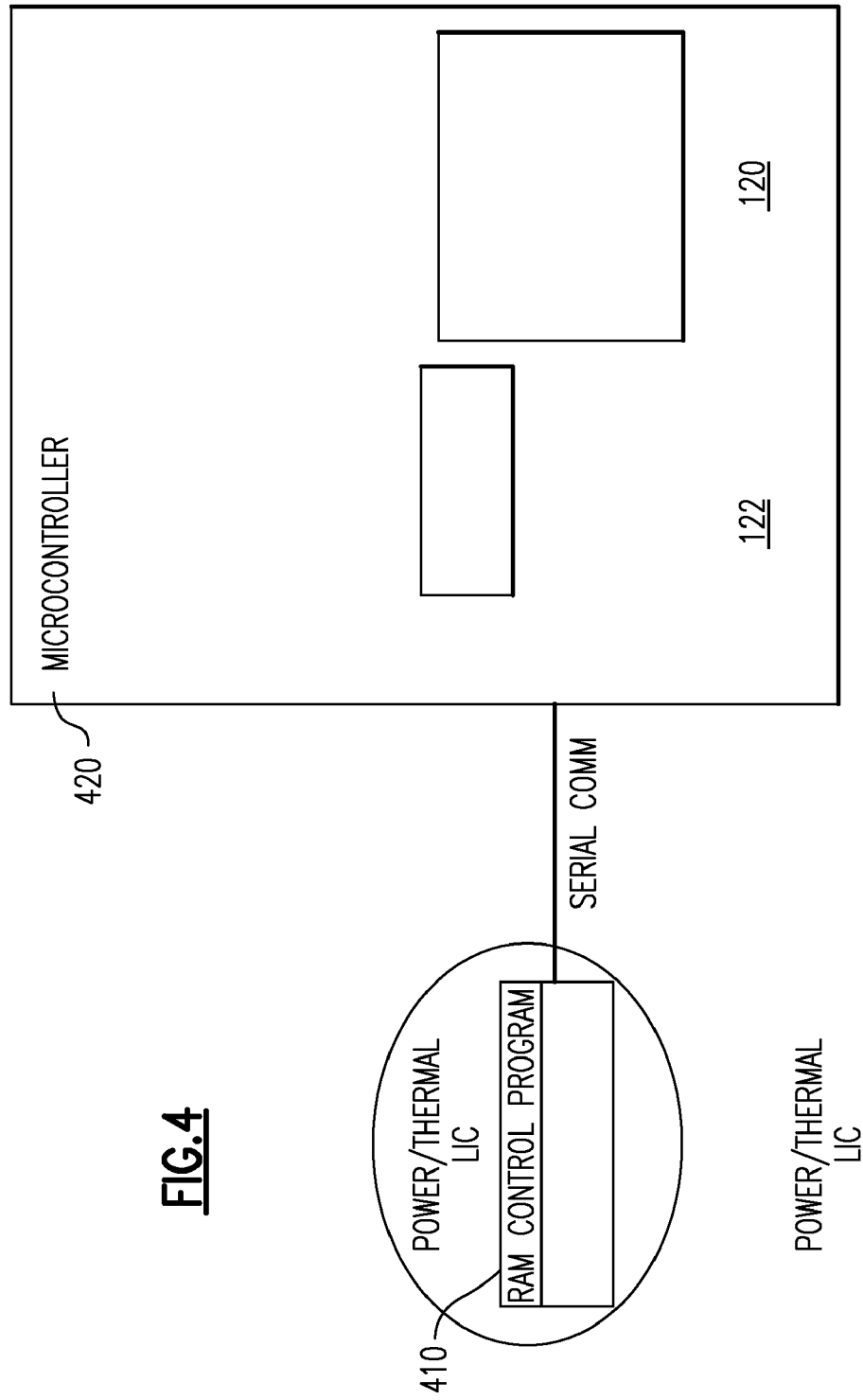
FIG. 4 provides a schematic illustration of a volatile memory or RAM.

A flash update can be described as a condition where all or part of the microcontroller's ROM is rewritten with new code. The flash update algorithm must be executed from RAM as it is not possible to update any part of the ROM while executing code from the ROM itself. FIGS. 2 through 4 discuss these concepts generally as it relates to the present invention. A special program, called the RAM control program, executes the flash algorithm from the RAM space as will be discussed presently.

In prior art, the drive to reduce the cost of hardware has left microcontrollers with a smaller footprint. Unfortunately, this has also reduced the reliability of in-system firmware updates. The present invention is designed to address inherent limitations associated with these microcontrollers, especially microcontroller families such as Intel 196 machines.

Referring now to FIG. 2, a schematic illustration of an environment utilizing a non-volatile memory such as the ROM 120 of FIG. 1 is provided. The ROM 120 comprises an application sector 220, where the command and control functions reside, and a non-volatile boot sector 210. A boot sector can be described as a data storage device or medium that contains code for booting programs, such as but not limited to operating systems, which are stored in other parts of the environment. In this regard, the boot sector 210, as provided here, is a semi-permanent area at the beginning of ROM 120 and is designed to only take up a few percent of the total ROM space. Therefore, the boot sector is designed for minimal function sets, including the Power-On-Reset, serial communications, the code to perform a flash update, CRC calculation functions and other essential base functions. Boot sector code is generally not application-specific. Because it consists of a minimal, generic set of functions, boot sector code generally does not require updating. While not a routine practice, it is possible to update boot sector code, by changing the RAM control program as will be discussed later.

The purpose of having a separate boot sector is to provide a safety feature in the event that power is lost to the microcontroller during a flash update. As long as the boot sector is intact, the microcontroller can respond to commands after power is restored, and the flash update can be resumed.

Traditionally, Boot sector updates are not frequent, but during those times where one needs to be performed, there is a window of vulnerability during which it is possible to lose communication with the microcontroller. This means that during those times, an in-system flash update is no longer possible. This window, commences right after the boot sector is erased, and ends just before it is completely rewritten. If the microcontroller loses power during that time window, the boot sector will not be completely programmed. When this occurs, communication is lost, and the in-system flash update will no longer be possible. In this situation, a service call must be made to replace the field replaceable unit (FRU) component. This is an undesirable situation, and the flash update algorithms of the present invention are specifically designed to minimize this risk.

By contrast, an application sector 220 is the area of the ROM, typically 90-plus percent of the total ROM space, which contains the code required to run the application. Application code updates are common, and are normally performed to add new function or fixes.

In FIG. 2, the state of the ROM 120 is illustrated at a cold start. A cold start is equivalent to a power-on-reset (POR). A POR is conducted when the microcontroller is powered on from a cold start; code execution begins at a ROM location that is fixed in hardware by the microcontroller, called the Power-On-Reset function. All necessary hardware and software initializations are performed in the Power-On-Reset function.

FIG. 3, more specifically delineates a flowchart to reflect the interaction of the boot sector 210 and application sector 220. However, before embarking on this discussion, several points should be explained about the prior art to ease the understanding of the present invention.

In prior art, the flash update algorithm was often executed from RAM, but the flash control program was present in the ROM, and was copied from ROM to RAM at the start of each code load. This meant that it was not possible to change the flash algorithm until new code had been burned to the ROM. In other words, changing the flash algorithm would require two complete flash updates. That caused a significant problem when it was necessary to fix an error in the control program. In addition, following the flash update, the microcontroller of these environments performed a cold start which cleared all RAM and re-initialized all of the microcontroller hardware which was costly and caused additional problems.

Furthermore in the prior art applications that used a boot sector approach, the boot sector was always updated every time the application sector was updated. While still providing the boot sector as a safety net during application updates, the requirement to update the boot sector on every code load resulted in the exposure to the window of vulnerability on every code load.

For environments that included power supplies and refrigeration units (such as modular refrigeration units or MRUs), reliability was important and to address the issues connected with flash updates problems, designs with redundant microcontrollers were provided. This usually took the form of a dual-FEPROM. This approach allowed one microcontroller to perform a flash update, while the other was executing the application so that microcontrollers can alternatively be updated without disturbing the running application. Unfortunately, while this approach was successful the cost was prohibitive. The need for incorporating another microcontroller in an inflexible footprint was also an issue in certain applications.

Referring back now to FIG. 2 and considering it in view to the flow chart of FIG. 3 and the prior art discussion, it can be understood the essence of how the ROM firmware has been implemented. As discussed, the ROM comprises of two parts, an application sector 220 and a boot sector 210. The application sector 220, which in one embodiment can even comprise more than 90% of the ROM space, is provided to contain the command and control function, such as a FRU. The firmware also contains a stable, and essentially static, boot sector 210 which comprises the remainder of the ROM space.

In this embodiment, the primary purpose of the boot sector 220 is to provide a minimal function set in the event that power is inadvertently cycled to the microcontroller during a flash update, leaving the application code only partially programmed. When the microcontroller reboots, the boot sector provides the communication infrastructure for subsequent flash update attempts. In previous designs, as discussed, the boot sector 210 was updated with each flash update. In the new design, the boot sector is essentially static. This should reduce the incidence of code-related non-recoverable errors, and partial code loads due to inadvertent power loss during flash update, to essentially zero. The boot sector is considered to be essentially static, since it still provides the ability to perform a flash update of the boot sector, if necessary.

The incidence of code related non-recoverable errors are kept to a minimal as provided in the illustration of FIG. 3. In the flowchart of FIG. 3, several factors are monitored to provide optimal reliability. At the start of a cold start, for example, the boot code calculates the cyclic redundancy check (CRC) in order to detect any errors. This step is referenced by numerals 310 as shown. If the CRC provides an unacceptable or bad result, the boot sector then contains all code necessary to update the application sector as illustrated by step 320. In case of an acceptable CRC, several other conditions are then checked such as illustrated in step 330. If power is lost during the application sector update, the boot sector provides basic communications so update can resume when power is restored as shown in step 340.

In addition, the boot sector can also be updated if needed to perform bug fixes and other enhancements selectively as shown in steps referenced by numerals 350 and 360. Once all such operations are performed, the execution is then transferred from the boot sector to the application sector as illustrated in step 370. It should be noted, that every time all such operations does not need to be performed and it is possible to selectively check on one or more of these conditions without checking for all before returning the execution to the application sector. This is reflected by the dotted lines illustrated in the figure.

FIG. 4 provides a schematic illustration of a volatile memory or RAM as referenced as 122. The RAM control program, referenced by numerals 410, in one embodiment, can be a part of a code driver. The RAM control program 410 executes flash update algorithm from the microcontroller's 420 RAM. In previous designs, the control program was present in ROM and was copied to RAM at the start of the flash update as discussed earlier. As explained, this meant that any change to the control program required two complete flash updates to take effect. In the present invention, the RAM control program 410 can be provided as a separate piece of code, such as with the system code driver example discussed. This allows the flash algorithm to be changed on an as-needed basis.

Figure 5:
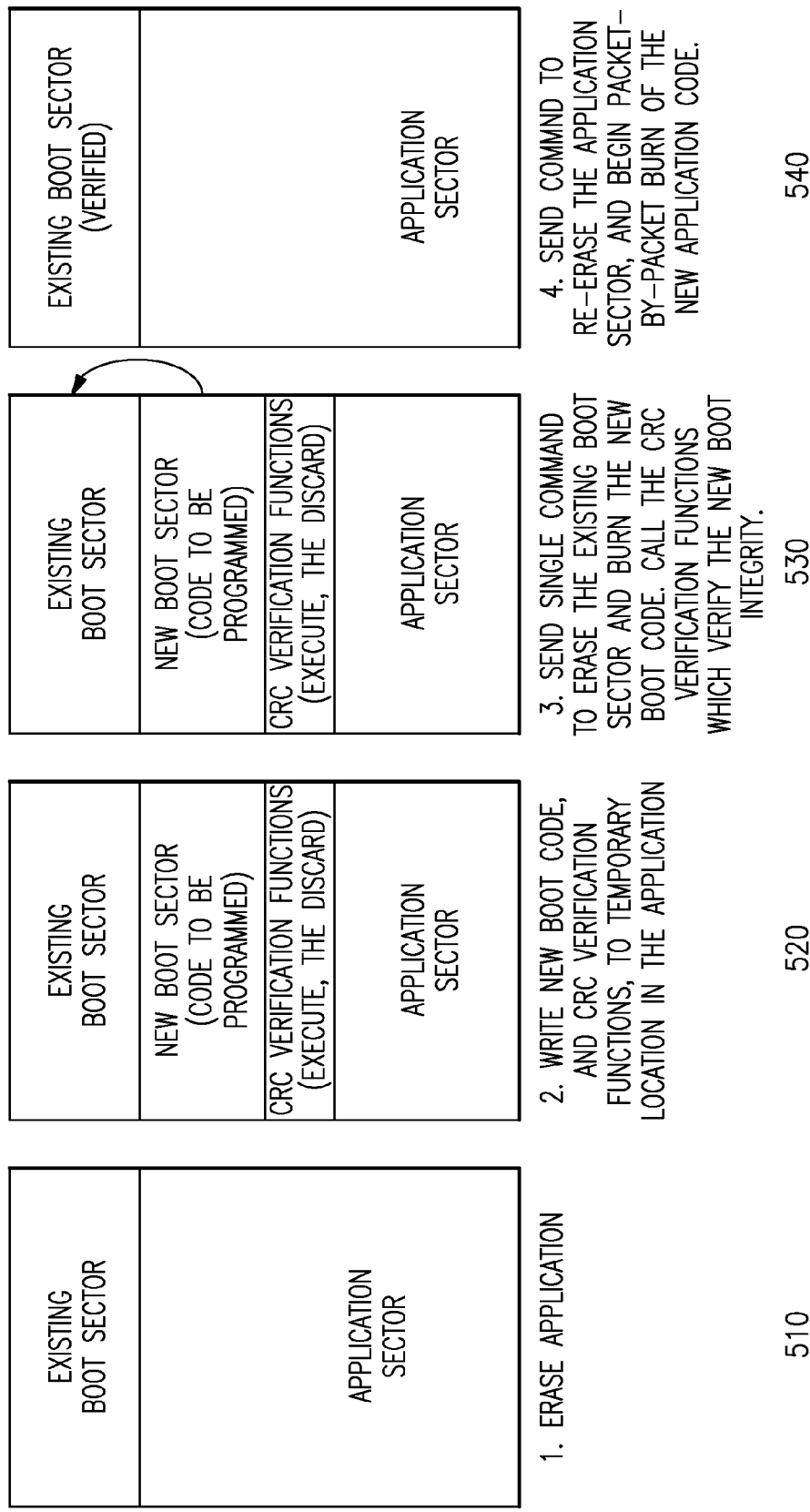
FIG. 5 is a schematic diagram showing an embodiment of the present invention where the boot sector needs to be updated.

FIG. 5 is a schematic diagram showing an embodiment of the present invention where the boot sector needs to be updated. For those infrequent times that the boot sector must be updated, speed is essential, to minimize the window of vulnerability between erasing and reprogramming the boot sector. In previous designs, the boot code, usually several KB in size, was written to a RAM buffer in its entirety, after which the ROM boot sector was erased and then reprogrammed with the data from the RAM buffer. In the case where the microcontroller has insufficient RAM to hold the entire boot sector, one solution would be to burn the boot code on a packet-by-packet basis, as each packet is transmitted. This would result in an unacceptably long window of vulnerability. In one embodiment of the present invention, however, this issue and this constraint has been overcome by using the strategy provided in FIG. 5.

In FIG. 5, the application area of the ROM is uses as a temporary "buffer" for the boot code as illustrated. The boot code is programmed in its entirety to the application area of the ROM, after which the boot sector is erased, as shown in step 510. The boot code is then copied from upper ROM to its destination in lower ROM. Here the new boot code, and CRC verification functions, to temporary location in the application as shown at 520 and then a single command is sent to erase the existing boot sector and burn the new boot code followed by a call for the CRC verification functions which verify the new boot integrity as illustrated at 530. Now the send command can be resumed as illustrated at 540 (it is erased before resuming send command to re-erase the application sector, and begin packet-by-packet burn of the new application code.) This meets the requirement of minimizing the window of vulnerability during boot updates.

In cases where the boot sector must be updated, it is essential to verify the integrity of the newly-programmed boot sector code before transferring execution to the boot code. When the microcontroller has insufficient RAM to hold all of the code necessary to perform flash update AND perform CRC verification, the approach as discussed in FIG. 5 can again be implemented. As discussed, in this case the CRC verification functions are again programmed to a temporary location in the application area of the ROM. At the same time that the boot code is programmed to its temporary location in the application area of the ROM. After creating a new boot code, the RAM control program utilizes the CRC verification functions, in their temporary location in the application area of the ROM, to verify the newly programmed boot code in the same manner as discussed before and illustrated in steps 510 to 540.

Figure 6:
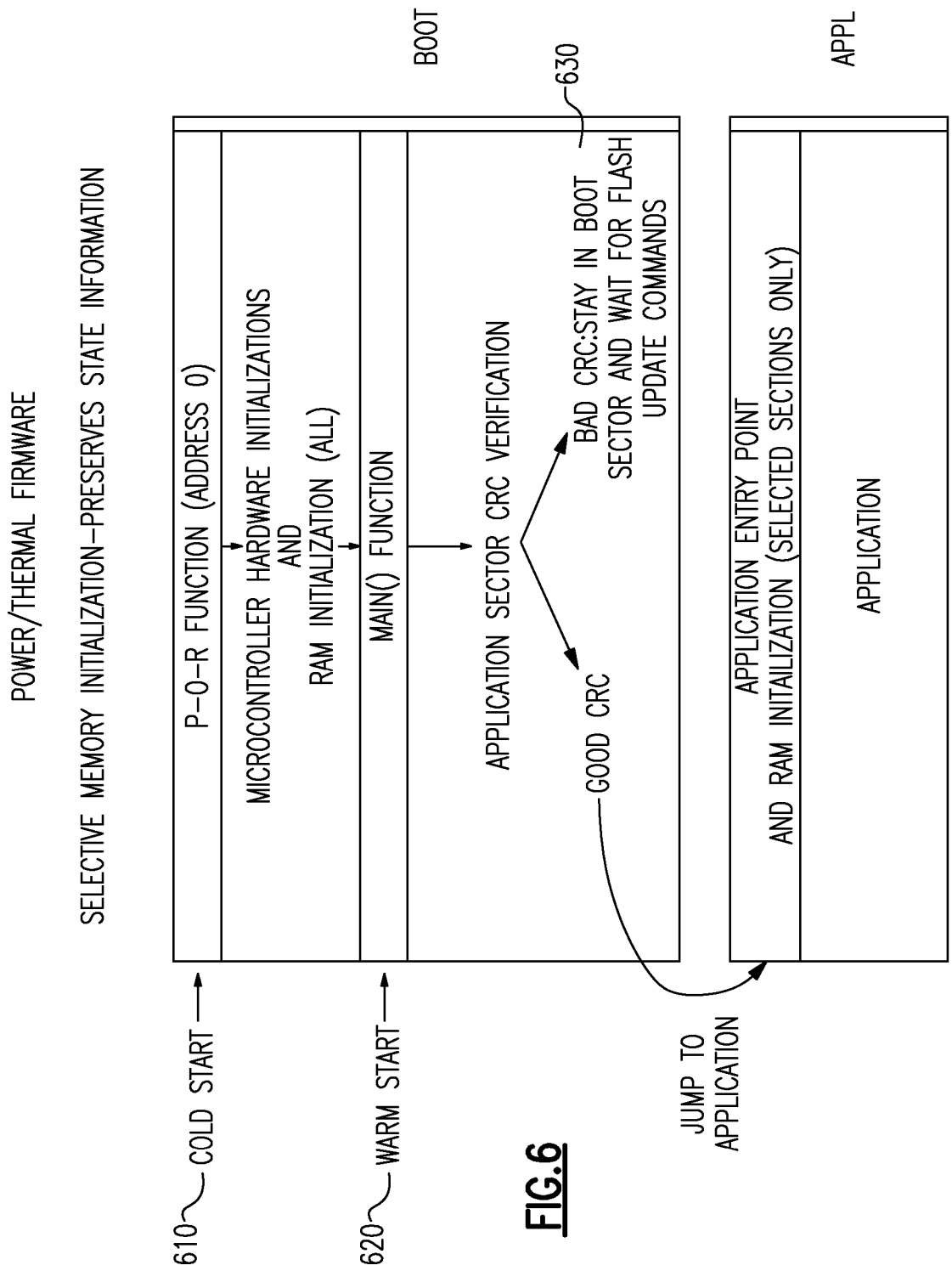
FIG. 6 provides for an embodiment of the present invention, having selective memory initialization that preserves state information.

It should be noted, that in previous designs implemented in the prior art, following a flash update, and the microcontroller performed a Power-On-Reset ("cold start"). This resulted in all RAM being initialized to zero, and all microcontroller hardware being initialized to its default state. In one embodiment of the present invention, as illustrated in FIG. 6, an embodiment of the present invention is introduced that has selective memory initialization that preserves state information. In this embodiment, as shown, a "warm start" area has been implemented in the firmware, which allows the execution to bypass the Power-On-Reset function. A warm can be defined as when the microcontroller undergoes a warm start, code execution begins at a ROM location in the boot sector called the main function, which bypasses the Power-On-Reset function, and therefore bypasses the normal hardware and software initializations. The firmware performs a warm start after a flash update is completed. This allows the contents of selected areas of RAM to be preserved through a flash update.

In order to do this, a new algorithm can be implemented in the firmware which allows developers to designate specified areas of RAM which are initialized to zero only on cold starts ("pinned B sections"), and another area, which is initialized to zero only on warm starts ("default B section"). The practical result is that any variables located in a pinned B section are initialized to zero on a cold start, as shown at 610, but on all subsequent warm starts, the data is undisturbed as shown at 620. This is important for preserving state information. In addition, bypassing Power-On-Reset using a warm start has the advantage of leaving the microcontroller hardware undisturbed. All digital I/Os remain in their current state through a flash update. This is particularly important for Power FRUs with Static Circuit Breakers (SCBs), since it allows flash updates to take place without opening and closing SCBs. CRC check is also conducted as shown at 630.

In a preferred embodiment, a design objective for the Power/Thermal firmware is to have a common, reusable, library of firmware functions. The benefits of code commonality and reuse are well known. All modern object-oriented computer languages incorporate the principles of commonality and reuse. The Power/Thermal firmware common library contains all of the essential infrastructure code required by the firmware applications, including communications; interrupt handlers, and memory initialization and management. In this embodiment, a new memory management algorithm is developed and implemented in the firmware that enables selected areas of RAM to be defined and initialized in common code, such as in a pinned B section, while still allowing individual developers to use those areas in their application-specific local code projects.

Without this new memory algorithm, it would be necessary for each developer to create pinned B sections in their own local projects, with new sections being created as needed. The problem with creating new pinned B sections is that after a flash update, pinned B sections are not initialized (since a cold start is required to initialize a pinned B section). Using this new memory algorithm, since a large section of RAM has already been set aside and initialized in common code, individual applications can utilize this memory as-needed, even if new variables are added to this area post-GA. One substantial benefit realized by this approach is that "disruptive" in-system code updates in a customer's office are minimized, if not eliminated.

Figure 7:
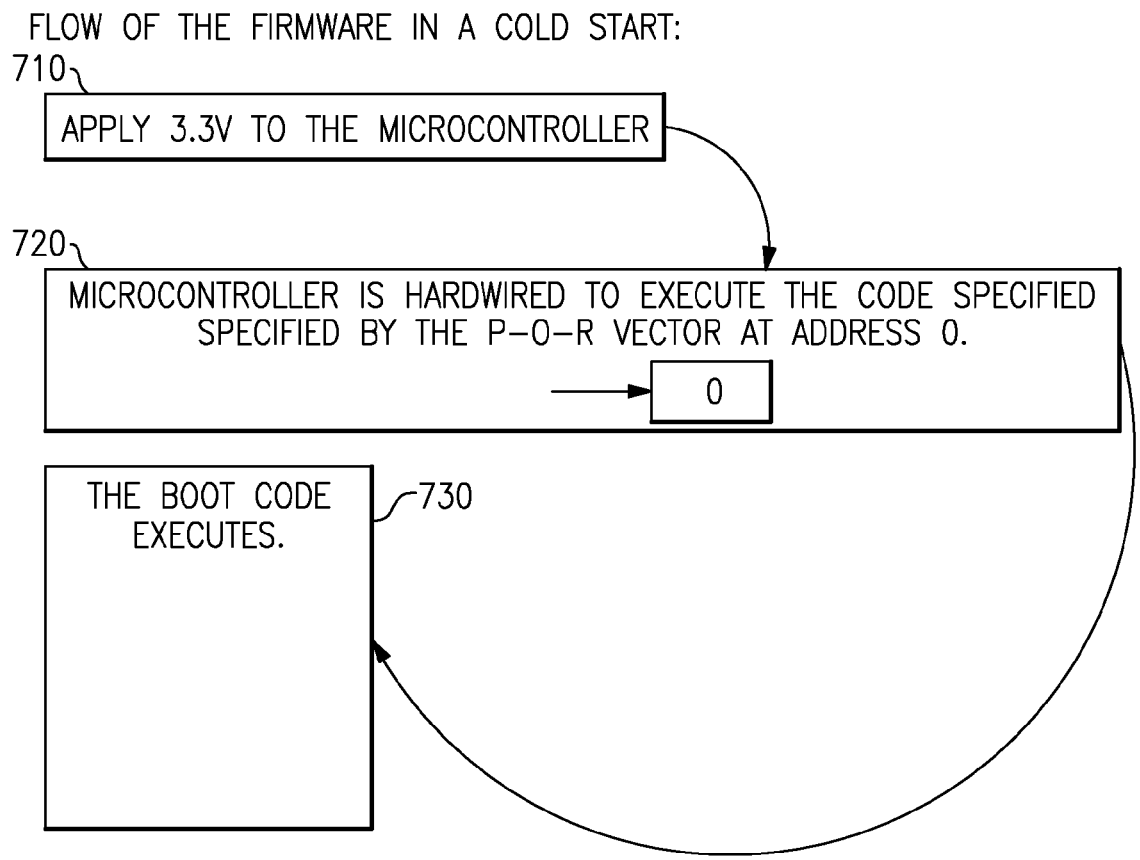
FIG. 7 provides for flowchart illustration of the functionality of a firmware as it related to embodiment of FIG. 6.
Figure 8:
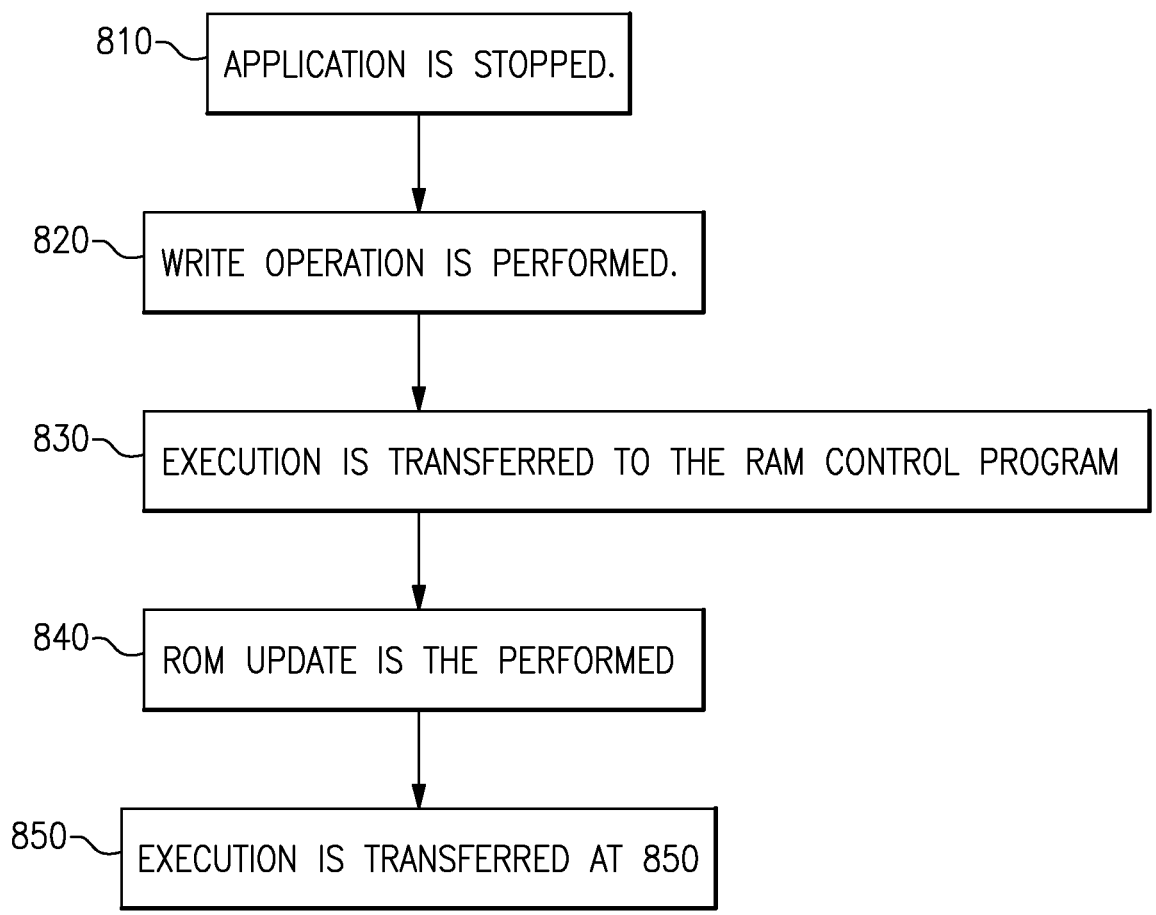
FIG. 8 is a flowchart illustration of a flash update, especially as it relates to the embodiment of FIG. 6.

FIGS. 7 and 8 provide for flowchart illustration of the functionality of a firmware and that of a flash update, respectively as discussed earlier especially with reference to FIG. 6. In FIG. 7, the flow of the firmware is provided from a cold start. As an example, 3.3 V is applied to the microcontroller as shown at step 710. The microcontroller is hardwired to execute the code specified by the POR vector at address 0 as shown at 720. The boot code then is executed as shown at 730. Here, the primary function in the boot code is to initialize the microcontroller hardware, and the RAM, and perform a CRC check of the application area. If the CRC calculation verifies the integrity of the application code, the firmware transfers execution ("jumps") to the application code, and starts running the application. If the CRC check fails, the micro does not jump to the application, but instead executes its boot program, which is a minimal set of functions that basically provides the ability to perform a flash update.

In FIG. 8, a flowchart of the flash update as per one embodiment of the present invention is provided. As shown at 810, at first the application is stopped. In step 820 a write operation is performed (Write the RAM control program to its location in RAM) and finally the execution is transferred to the RAM control program as shown at 830. The ROM update is then performed at 840 which include: Erase the application area followed optionally by erase the boot sector and updating the boot code. Finally the application code is updated. Once this is performed the execution is transferred at 850. This Transfer execution includes a jump to the "warmstart" area of the ROM, bypassing P-O-R.

Taken together, the present invention as discussed in conjunction with FIGS. 1 through 8 provides practical means to reliably update the firmware of an environment, such as one that includes a microcontroller and even large components such as servers. The present invention allows the firmware to perform command and control function on a power/thermal component in a high-availability, fault-tolerant, high-performance environment, even large environments that can include one or more servers. The firmware design, in one embodiment, includes a "nonvolatile" ROM boot sector, which normally is not updated, but intended to reduce the incidence of code-related nonrecoverable errors, and partial code loads due to inadvertent power loss during flash update, to essentially zero. In another embodiment, it also includes a computer program, called the RAM control program, which can be provided as part of the code driver. The code driver consists of the Power/Thermal LIC, the firmware (ROM) which is to be loaded onto the Power/Thermal component(s), and the RAM control program. In one embodiment, a new algorithm can be implemented in the RAM control program for providing temporary storage for the ROM boot portion of the firmware, that storage being located in the application ROM area of the microcontroller. In a different embodiment, another algorithm can be implemented in the RAM control program for storing some necessary computer programs ("functions"), which are required for flash update, temporarily, in the application ROM area of the microcontroller (due to hardware limitations, there is insufficient RAM to store those functions in RAM during flash update). Other algorithms can also be implemented in other embodiments. For example, one algorithm implemented in the firmware can include steps for performing selective memory initialization of the microcontroller's RAM. Another algorithm implemented in the firmware can include steps for defining and managing an area of microcontroller RAM such that the area can be defined in common code, and implemented in local code.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system for performing a high reliability flash update to a nonvolatile memory, the system comprising:
   the nonvolatile memory, the nonvolatile memory comprising a boot sector and an application sector, wherein said boot sector comprises a function set, wherein code execution by the system begins with the function set in the boot sector responsive to a cold start of the system; and
   a volatile memory in processing communication to with the nonvolatile memory to facilitate performing the flash update to the nonvolatile memory, the volatile memory including a flash update algorithm for execution to perform the flash update to the nonvolatile memory, wherein performance of the flash update applies updated boot sector code to the boot sector, wherein the updated boot sector code is copied to the application sector of the nonvolatile memory, and wherein responsive to the copying of the updated boot sector code to the application sector, the boot sector is erased and the updated boot sector code is copied to the boot sector from the application sector.

2. The system of claim 1, wherein said volatile memory is a RAM and said nonvolatile memory is a ROM memory.

3. The system of claim 2, wherein said system comprises a microcontroller.

4. The system of claim 3, wherein said flash update algorithm and the updated boot sector code are included in a control program.

5. The system of claim 4, wherein said control program is packaged as part of a code driver for the microcontroller.

6. The system of claim 1, wherein said system provides command and control functions for power/thermal components.

7. The system of claim 1, wherein at least one verification function for verifying the updated boot sector code is copied to the application sector, and wherein the copying of the updated boot sector code to the boot sector and initiation of the verification function is performed as part of a single command.

8. The system of claim 7, wherein said verification function comprises a cyclic redundancy error check for detecting data errors.

9. The system of claim 1, wherein the function set comprises a Power-On-Reset function for initializing the volatile memory, and wherein responsive to performing the update, a warm start of the system is performed in which execution of the Power-On-Reset function is bypassed to bypass the initialization of the volatile memory, in order to facilitate preserving state information of the system, wherein said warm start directs the execution of commands in a way that reinitialization of said nonvolatile memory results absent requiring the Power-on-Reset function to be performed.

10. The system of claim 9, wherein the state information is stored in one or more pinned sections of the volatile memory, the pinned sections being previously initialized in a common code area available to multiple applications executing on the system and initialized prior to updating the nonvolatile memory, wherein the common code area comprises at least one common library of reusable firmware functions, the at least one common library including infrastructure code usable by firmware of the system to update the multiple applications and manage communications, interrupt handlers and memory initialization and management of the system.

11. A method for performing a high reliability flash update to a nonvolatile memory, the method comprising:
providing in a system the nonvolatile memory, the nonvolatile memory having a boot sector and an application sector, wherein the boot sector comprises a function set, wherein code execution by the system begins with the function set in the boot sector responsive to a cold start of the system; and
providing volatile memory in communication with the nonvolatile memory to facilitate performing the flash update to the nonvolatile memory, the volatile memory including a flash update algorithm for execution to perform the flash update to the nonvolatile memory, wherein performance of the flash update applies updated boot sector code to the boot sector, wherein the updated boot sector code is copied to the application sector of the nonvolatile memory, and wherein responsive to the copying of the updated boot sector code to the application sector, the boot sector is erased and the updated boot sector code is copied to the boot sector from the application sector.

12. The method of claim 11, wherein said system comprises a microcontroller, and wherein the method further includes including the flash update algorithm and the updated boot sector code in a control program, and packaging the control program as part of a code driver for the microcontroller.

13. The method of claim 11, wherein at least one verification function for verifying the updated boot sector code is copied to the application sector, and wherein the copying of the updated boot sector code to the boot sector and initiation of the verification function is performed as part of a single command.

14. The method of claim 13, wherein the at least one verification function comprising a cyclic redundancy error check for detecting data errors.

15. The method of claim 11, wherein the function set comprises a Power-On-Reset function for initializing the volatile memory, and wherein responsive to performing the update, a warm start of the system is performed in which execution of the Power-On-Reset function is bypassed to bypass the initialization of the volatile memory, in order to facilitate preserving state information of the system, wherein said warm start directs the execution of commands in a way that reinitialization of said nonvolatile memory results absent requiring the Power-on-Reset function to be performed.

16. The method of claim 15, wherein the state information is stored in one or more pinned sections of the volatile memory, the pinned sections being previously initialized in a common code area available to multiple applications executing on the system and initialized prior to updating the nonvolatile memory, wherein the common code area comprises at least one common library of reusable firmware functions, the at least one common library including infrastructure code usable by firmware of the system to update the multiple applications and manage communications, interrupt handlers and memory initialization and management of the system.

17. The method of claim 11, wherein said system provides command and control functions for power/thermal components.

18. A method for updating code stored in a nonvolatile memory of a system, the method comprising:
executing a flash update algorithm for applying the updated code to the nonvolatile memory, the flash update algorithm stored in volatile memory in processing communication with the nonvolatile memory, wherein the nonvolatile memory comprises a boot sector and an application sector, the boot sector comprising a function set, wherein code execution by the system begins with the function set in the boot sector responsive to a cold start of the system, and wherein applying the updated code applies updated boot sector code for the boot sector of the nonvolatile memory, wherein applying the updated boot sector code comprises:
copying at least a portion of the updated boot sector code to the application sector of the nonvolatile memory;
erasing the boot sector; and
copying the portion of the updated boot sector code to the boot sector from the application sector.

19. The method of claim 18, wherein the applying the updated boot sector code further comprises:
copying at least one verification function to the application sector, the at least one verification function comprising a cyclic redundancy error check for detecting data errors in the updated boot sector code copied to the boot sector; and
initiating the verification function, wherein the copying of the updated boot sector code to the boot sector and the initiating the verification function is performed as part of a single command.

20. The method of claim 18, wherein the function set comprises a Power-On-Reset function for initializing the volatile memory, and wherein the method further comprises performing a warm start of the system in which execution of the Power-On-Reset function is bypassed to bypass the initialization of the volatile memory, in order to facilitate preserving state information of the system, wherein said warm start directs the execution of commands in a way that reinitialization of said nonvolatile memory results absent requiring the Power-on-Reset function to be performed, and wherein the state information is stored in one or more pinned sections of the volatile memory, the pinned sections being previously initialized in a common code area available to multiple applications executing on the system and initialized prior to updating the code stored in the nonvolatile memory, wherein the common code area comprises at least one common library of reusable firmware functions, the at least one common library including infrastructure code usable by firmware of the system to update the multiple applications and manage communications, interrupt handlers and memory initialization and management of the system.

* * * * *